(No Model.) 4 Sheets—Sheet 1.

W. H. WILD.
WHEEL RAKE.

No. 367,486. Patented Aug. 2, 1887.

Witnesses:
Reinhardt Heller.
John T. Booth

Inventor.
William H. Wild
by Geo. Mosher
atty (No Model.) 4 Sheets—Sheet 4.
W. H. WILD.
WHEEL RAKE.
No. 367,486. Patented Aug. 2, 1887.
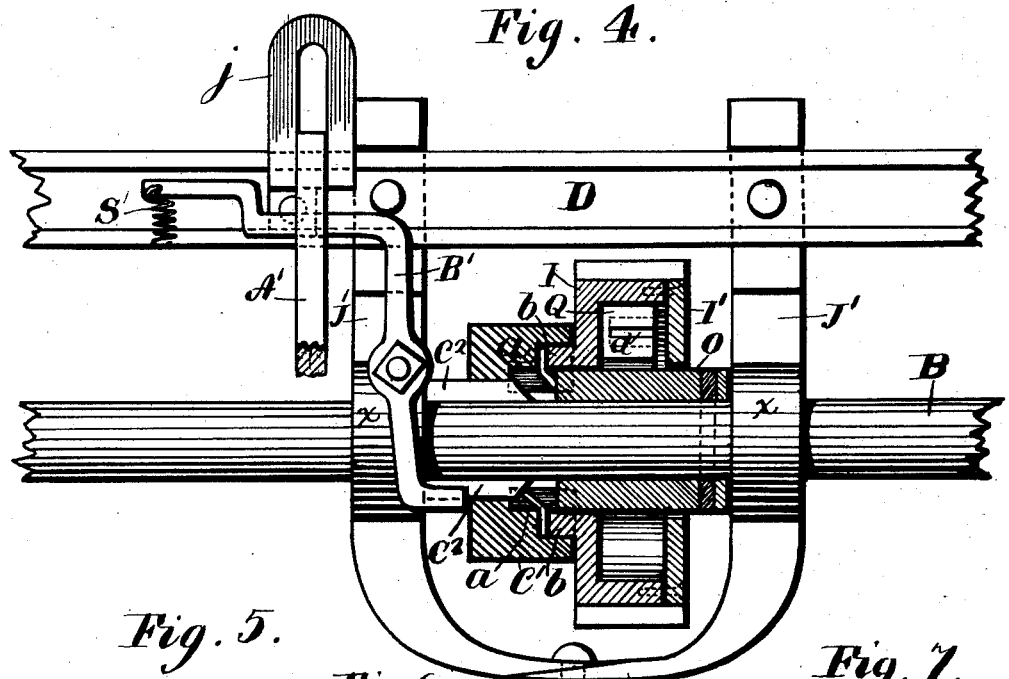
Fig. 4.
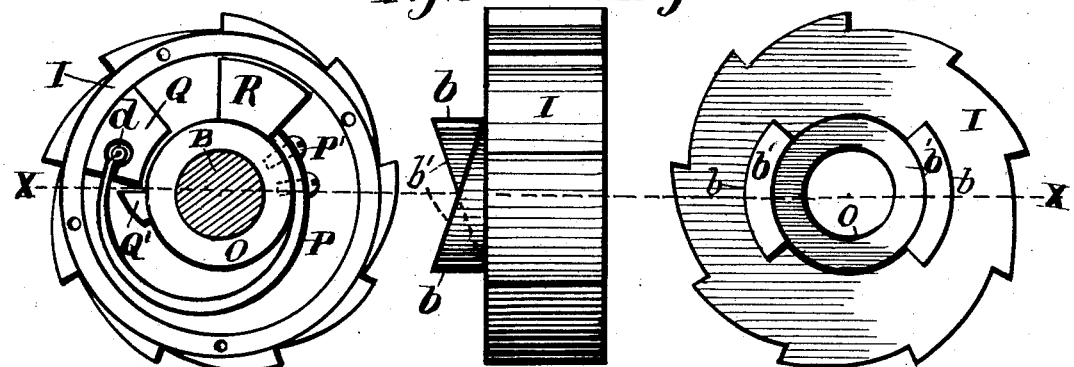
Fig. 5. Fig. 6. Fig. 7.
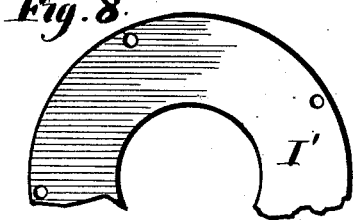
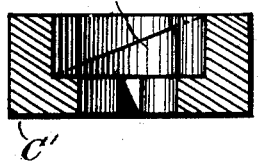
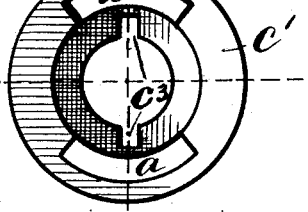
Fig. 8. Fig. 9. Fig. 10.
Witnesses:
Reinhardt Heller
John T. Booth
Inventor.
William H. Wild
by Geo. A. Mosher
atty.

UNITED STATES PATENT OFFICE.

WILLIAM H. WILD, OF VALATIE, NEW YORK.

WHEEL-RAKE.

SPECIFICATION forming part of Letters Patent No. 367,486, dated August 2, 1887.

Application filed December 30, 1886. Serial No. 222,979. (No model.)

*To all whom it may concern:*

Be it known that I, WILLIAM H. WILD, a resident of Valatie, in the county of Columbia and State of New York, have invented certain new and useful Improvements in Wheel-Rakes; and I do hereby declare that the following is a full, clear, and exact description of the invention, that will enable others skilled in the art to which it appertains to make and use the same, reference being had to the accompanying drawings, and to the letters of reference marked thereon, which form a part of this specification.

Similar letters refer to similar parts in the several figures therein.

My invention relates to improvements in wheel-rakes, and more especially to the dumping mechanism; and it consists of the novel construction and combination of parts hereinafter described, and pointed out in the claims.

The objects of the invention are fully set forth in connection with the following description.

Figure 1:
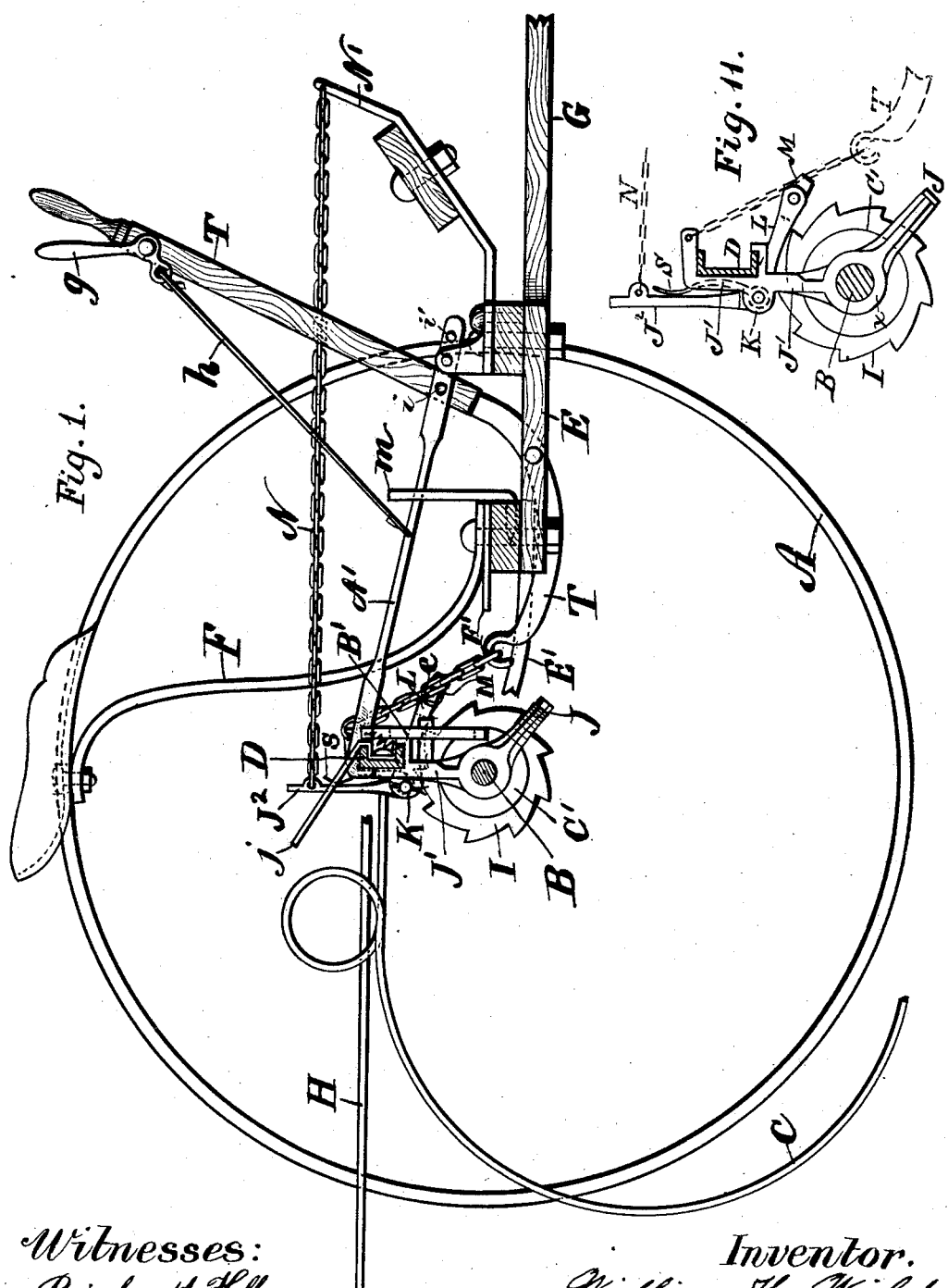
Figure 2:
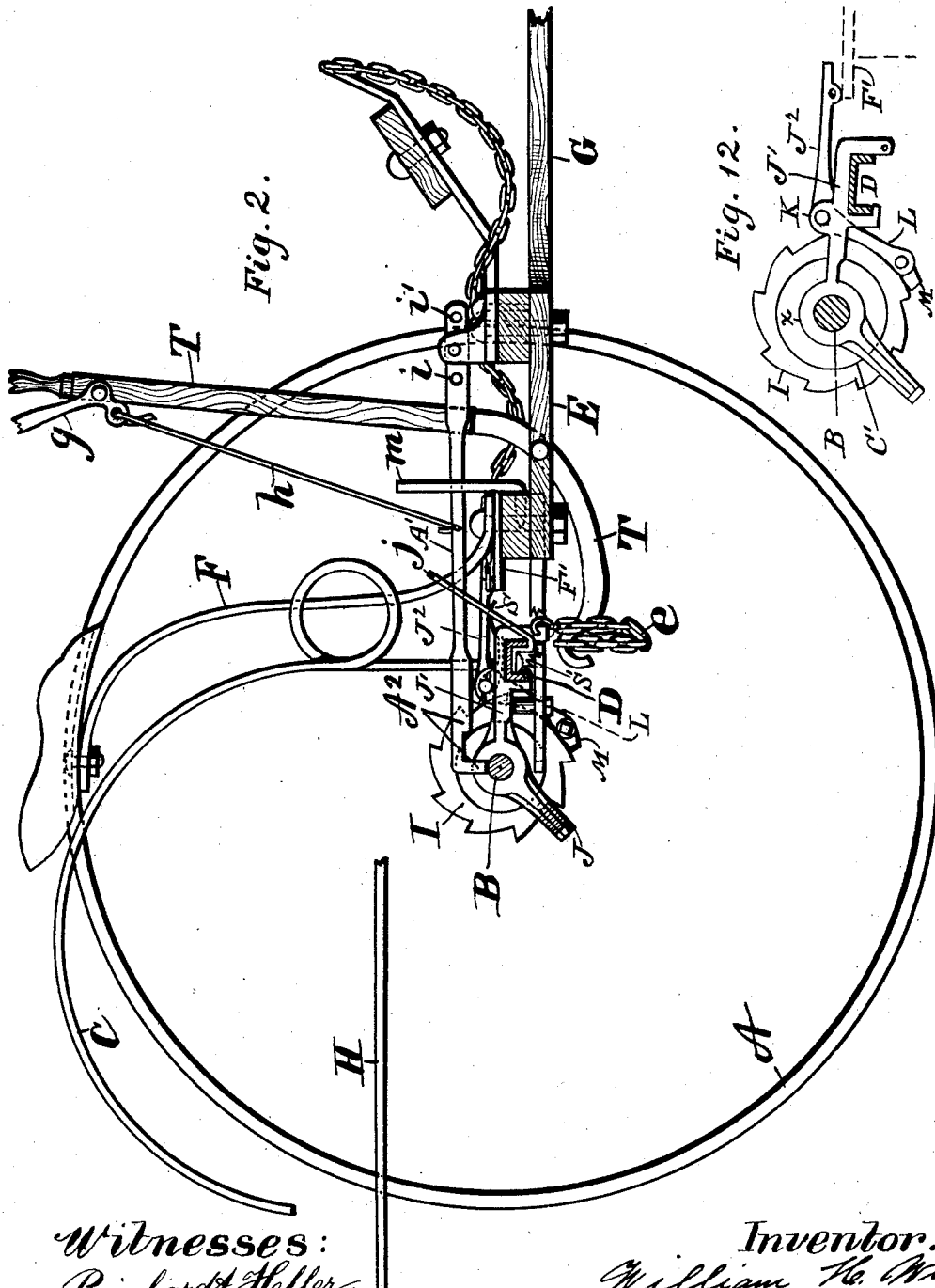
Figure 3:
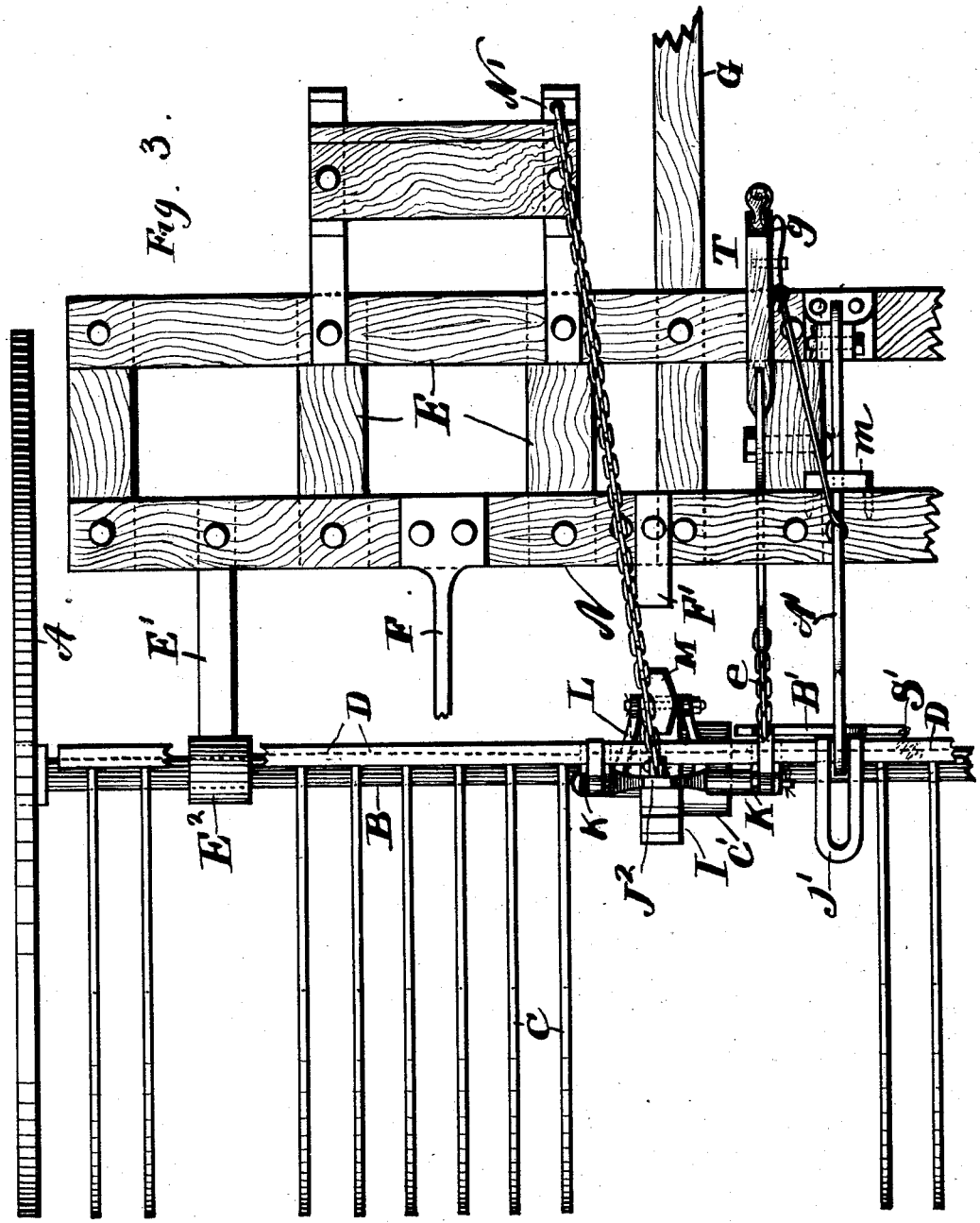

Figure 1 of the drawings is a side elevation of the dumping device mounted upon a section of the main axle and showing the relative position of various other parts when the rake-teeth are upon the ground. Fig. 2 is a similar view showing the rake-teeth lifted to the limit of elevation in dumping. Fig. 3 is a plan view of the rake with a portion of one side, like the side shown, broken away. Fig. 4 is a front elevation, partly in section, of the dumping mechanism, the sections taken being shown on the broken line $x$ $x$ in Figs. 5, 6, 7, and 10, the ratchet-engaging pawl not being shown. Fig. 5 is a side elevation of loose ratchet-wheel I and some of its connecting parts, with plate I' removed and viewed from the right-hand side, as seen in Fig. 4. Fig. 6 is a front elevation of loose ratchet-wheel detached. Fig. 7 is a left-hand side elevation of same. Fig. 8 is a plan view of a portion of plate I'; Fig. 9, a central longitudinal section of spline-wheel C' detached. Fig. 10 is an end view of same detached and viewed from the right, as shown in Fig. 4. Figs. 11 and 12 illustrate, respectively, the positions of certain parts during raking and when dumping.

The rake, aside from the dumping mechanism, may be constructed in any of the well-known forms, consisting of driving-wheels A, axle B, teeth C, attached to a common head, D, frame E, secured to the axle by reaches E' and bearings E² and provided with a seat-supporting standard, F, and pole G, shown broken. I have simply indicated the position of the clearing-fingers at H.

The rake-head is held in place to prevent its dumping prematurely by the latch A', pivoted at one end to the rake-frame, the other end being provided with head-inclosing jaws A². (Shown in Fig. 2.)

When it is desired to dump the rake, the latch A' is lifted from engagement with the rake-head by the lever B', acted upon by the spline-wheel C', which latter is caused to slide longitudinally of the axle by engaging lugs upon the side of ratchet-wheel I, loose upon sleeve O, fixed upon the axle, as will hereinafter be more fully explained.

The loose ratchet-wheel I and fixed sleeve O are mounted upon the axle between the arms J' of a yoke, J, loosely mounted upon the axle, a suitable bearing, $x$, being provided in each arm. The bend of the yoke extends below the axle, and the arms J' are extended above and are secured to the rake-head D, which they support. The yoke-arms are provided with ears K, which support the pivoted arms L, which carry a revoluble pawl, M, between their lower extremities in position to be brought into engagement with the ratchet-wheel I on axle B. The arms L are extended upward from their pivotal bearings and united to form a yoke, J², which forms a lever-arm and is connected by a chain, N, with a fixed support, N', secured to the frame. The spring S, between the arm and rake-head, secured at its lower end upon the pawl-pivot, as shown by dotted lines in Figs. 1 and 2, serves to force the arm back and lift the dog M clear of the ratchet-teeth. By pressing down upon the chain the resiliency of this spring is overcome and the dog forced down into engagement with the teeth, which momentarily arrests the progress of the ratchet-wheel, the object of which will be readily understood after an examination of the interior of the wheel and co-operating mechanism, illustrated in Figs. 4, 5, 6, 7, 8, 9, and 10.

The ratchet-wheel is hollow or cup shaped, its open end being covered by a disk, I', perforated to receive the axle and sleeve O, and secured to the wheel by screws, as shown by dotted lines in Fig. 4. The wheel and disk are loosely revoluble upon the sleeve O, fixed upon the axle, except that it has a spring connection therewith, as shown in Fig. 5, the spring-strap P being secured at one end to the sleeve, as by screws P', and at the other end to a lug, Q, projecting interiorly from the shell of the ratchet-wheel, and provided with a slotted opening, $d$, into which the head of the spring is slid from the open side before the disk I' is secured to the wheel. The resiliency of the spring acts to force the wheel around with the sleeve and keep the lug Q in contact with the stop Q', projecting from the sleeve. The sleeve is also provided with a projecting lug, R, adapted to engage with the lug Q whenever the detaining force applied to the ratchet-wheel is sufficient to overcome the resiliency of the spring P. As soon as such engagement takes place the whole power of the drive-wheels is applied to the ratchet-wheel, and through it to the pawl-lever $J^2$, (not shown in Fig. 4,) to dump the rake.

The wheel C' slides on the axle and is made to rotate therewith by the fixed splines $C^2$, fitting in grooves $C^3$. The side of said wheel C' next to ratchet-wheel I is recessed, (see Figs. 4, 9, and 10,) and is provided with inclined surfaces $a$, which are adapted to engage with projections $b$ on wheel I, having inclined surfaces $b'$, and during the interval of time which elapses between the first engagement of the pawl M with the ratchet-wheel and the engagement of lug R with lug Q the wheel C' is forced, by the bearing movement against each other of the inclined surfaces $a$ and $b'$, to slide from the ratchet-wheel and actuate the lever B', which lifts the latch A' from the rake-head just before the lugs Q and R are brought into engagement with each other. As soon as the lug R comes into engagement with lug Q it is evident that the ratchet-wheel must rotate with the axle and carry with it the pawl pivoted upon the supporting-frame of the rake-head, which latter being pivoted upon the axle carries the head and teeth from the position shown in Fig. 1 to that shown in Fig. 2, which is the desired dumping movement. When the parts reach the position shown in Fig. 2, the lever-arm $J^2$ strikes a fixed stop, F', which arrests its progress and releases the ratchet-wheel from the pawl, whereupon the teeth fall by gravity to the ground again, the parts resuming the positions shown in Fig. 1. The resiliency of spring P forces the ratchet-wheel forward again, in advance of the axle and sleeve O, to about the position shown in Fig. 5, and the latch A' re-engages the head, the lower end of lever B' being forced against wheel C' by the spring S', secured one end of the spring to the head and the other end to the upper end of the lever.

I have also provided means for dumping the rake by hand when the drive-wheels are at rest or the machine given a backward movement, which consists of a hand-lever, T, pivoted upon the rake-frame, and connected at its lower end with the rake-head by means of a cable or chain, $c$. The lever T is also provided with a releasing-lever, $g$, pivoted thereon, and connected by a link, $h$, with the latch A', by means of which the latch is lifted from the rake-head to release it.

To dump the rake by hand, it is only necessary to lift latch A' by means of lever $g$, and afterward pull upon the upper end of lever T until the teeth of the rake are lifted to the required height. The slotted guide $j$, secured to the rake-head, and slotted guide $m$, secured to the frame, serves merely as guides to limit the movements of latch A'.

The position of the rake head and teeth while in use may be varied by changing the pivot of latch A' from the position shown to one of the apertures $i$ $i'$ therein. If changed to $i$, the head will be thrown forward and the teeth given a more elevated position, while a change to $i'$ will throw the head backward and drop the teeth lower.

The chain N is not an essential feature of my invention, as the driver can reach the pawl from his seat and force it into engagement with the ratchet-wheel with his hand, or operate the pawl by means of a hand or foot lever.

When it is desired to dump the rake, it is only necessary for the driver to place the pawl in engagement with the ratchet-wheel, whereupon all the other movements necessary to dump the rake follow automatically, as before explained, the operation being briefly stated as follows: While the rake is in use the ratchet-wheel rotates with the axle uninterruptedly until the pawl is brought into engagement with the ratchet-wheel, which arrests its rotary movement and detains the wheel until the rake-head is released from the retaining-latch A', as before explained, and until the lug R, traveling with the continuously-rotating axle, strikes the lug Q, fixed upon the ratchet-wheel, and renews the rotary movement of the wheel; but the pawl being in engagement with the ratchet-wheel and secured to the rake-head or its supports, which are pivoted upon the axle, forces the rake-head and teeth from the position shown in Fig. 1 to that shown in Fig. 2, which dumps the rake. Immediately upon reaching the dumping position (shown in Fig. 2) the projecting arm $J^2$ of the pawl strikes the stop F'', which releases the pawl and rake-head from the ratchet-wheel, whereupon the parts resume the position shown in Fig. 1, where they are held by the latch A' ready for raking again. I am thus able to automatically dump the rake and restore it to the proper position for raking, where it will be securely held until the pawl is again thrown into engagement with the ratchet-wheel, when the dumping movement will be repeated.

What I claim as new, and desire to secure by Letters Patent, is—

1. In combination with the axle of a wheel-rake, a ratchet-wheel mounted thereon and provided with lateral projections with inclined surfaces, substantially as shown, a pawl to connect with said wheel, a wheel constructed to slide on the axle and provided with inclined surfaces in position to engage with said projections, with inclined surfaces on the ratchet-wheel, and a pivoted lever in position to be actuated by the lateral movement of the sliding-wheel, substantially as set forth and described.

2. In a wheel-rake, the combination, with a rake-head pivotally supported by the driving-axle, of a ratchet-wheel revoluble on said axle and spring connected therewith, said wheel and axle being provided with coacting lugs to close one with another, substantially as shown, spline-wheel C', rotary with the axle, and both of said wheels being provided with engaging inclined planes, as *a* and *b'*, detachable head-locking latch A', arm-releasing lever B', actuated by said spline-wheel, and a ratchet-engaging pawl connected with the rake-head, substantially as and for the purposes set forth.

3. In combination with the axle, sleeve O, provided with lugs Q' and R, ratchet-wheel I, provided with spring P and lug Q, spline-wheel C', and a pivoted lever adjacent thereto, and the pawl mounted on yoke J, and provided with the revoluble part M, substantially as described, for the purposes set forth.

In testimony whereof I have hereunto set my hand this 9th day of December, 1886.

WILLIAM H. WILD.

Witnesses:
   GEO. A. MOSHER,
   CHAS. L. ALDEN.